United States Patent
Hwang et al.

(10) Patent No.: US 7,904,791 B2
(45) Date of Patent: Mar. 8, 2011

(54) INFORMATION RECORDING MEDIUM TO WHICH EXTRA ECC IS APPLIED, AND METHOD AND APPARATUS FOR MANAGING THE INFORMATION RECORDING MEDIUM

(75) Inventors: Sung-hee Hwang, Suwon-si (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 994 days.

(21) Appl. No.: 11/693,801

(22) Filed: Mar. 30, 2007

(65) Prior Publication Data

US 2008/0168328 A1    Jul. 10, 2008

(30) Foreign Application Priority Data

Aug. 10, 2006   (KR) .................. 10-2006-0075805

(51) Int. Cl.
*G11C 29/00*   (2006.01)

(52) U.S. Cl. ......................... 714/769; 714/758

(58) Field of Classification Search .................. 714/769, 714/758

See application file for complete search history.

(56) References Cited

U.S. PATENT DOCUMENTS

| | | | |
|---|---|---|---|
| 7,047,476 B2 | 5/2006 | Nagai et al. | |
| 2004/0114484 A1 | 6/2004 | Sako et al. | |
| 2005/0028067 A1 * | 2/2005 | Weirauch | 714/758 |

FOREIGN PATENT DOCUMENTS

| | | |
|---|---|---|
| KR | 2007-80692 | 8/2007 |
| KR | 2007-99387 | 10/2007 |
| WO | WO 2006/009290 | 1/2006 |

OTHER PUBLICATIONS

PCT International Search Report and Written Opinion issues in corresponding PCT International Application No. PCT/KR2007/003372 dated Oct. 18, 2007.

* cited by examiner

*Primary Examiner* — Sam Rizk
(74) *Attorney, Agent, or Firm* — NSIP Law

(57) ABSTRACT

An information recording medium to which data extra ECC is applied, and a method and apparatus for managing the information storage medium is provided. The method includes: determining whether extra ECC is applied with respect to data that is to be recorded on the information recording medium, and deciding an extra ECC application rate; assigning an area for recording a data block including an extra parity generated by applying the extra ECC to the data that is to be recorded on the information recording medium, to the information recording medium; assigning an extra ECC management information area for recording extra ECC management information for managing the extra ECC, to the information recording medium; and recording or updating the extra ECC management information in the extra ECC management information area. Therefore, it is possible to improve reproduction reliability while maintaining reproduction compatibility with conventional apparatuses.

28 Claims, 6 Drawing Sheets

INFORMATION RECORDING MEDIUM TO WHICH EXTRA ECC IS APPLIED, AND METHOD AND APPARATUS FOR MANAGING THE INFORMATION RECORDING MEDIUM

CROSS-REFERENCE TO RELATED APPLICATIONS

This application claims all benefits accruing under 35 U.S.C. §119 from Korean Patent Application No. 2006-75805, filed on Aug. 10, 2006 in the Korean Intellectual Property Office, the disclosure of which is incorporated herein by reference.

BACKGROUND OF THE INVENTION

1. Field of the Invention

Aspects of the present invention relate to an information recording medium in which data is subjected to error correction coding (ECC) and stored, and a method and apparatus for managing the information storage medium.

2. Related Art

Error correction coding (ECC) formats standardized for existing optical disc systems, such as DVDs, HD DVDs, Blu-ray discs, etc., define ECC performance for burst errors, such as scratches or fingerprints, and for random errors, such as dust Over time, the reliability of data recorded on the discs gradually deteriorates due to factors, such as dust, scratches, fingerprints, etc. Other factors impacting reliability include the influence of recording and reproduction powers and the user's treatment of the disc. In particular, it is difficult to recover data from a disc seriously damaged by burst errors.

Recently, DVDs have been developed that can correct successive errors of up to 16 rows (16×183+10 bytes) of an ECC format. The length which can be corrected depends on the recording density of data on the disc. For general DVDs, successive errors corresponding to a physical length of about 6 mm can be corrected. For HD DVDs, successive errors corresponding to a physical length of about 6.4 mm can be corrected. For Blu-ray discs, successive errors corresponding to a physical length of about 9 mm can be corrected.

Frequent use causes the disc's condition to deteriorate and increases the number of errors (such as scratches) on the disc. As the number of errors increases, reliability of data on the disc decreases, reducing the disc's lifespan. Also, physical scratches, etc., on the disc surface significantly increase the probability that error correction will fail when data on the disc is reproduced (read). Physical scratches on the disc surface can be created, for example, when an objective lens of a pick-up for recording and reproducing comes into contact with the disc surface or when the user treats the disc carelessly. If, as a result of the reduced data reliability, errors cannot be corrected when the data is reproduced, data recorded by a user will be lost.

Further, if data is recorded in a new ECC format not compatible with existing ECC formats, compatibility with existing products is not ensured and thus users will be limited in their use of the discs.

SUMMARY OF THE INVENTION

Aspects of the present invention provide an information recording medium, and a method and apparatus for managing the information recording medium, which are capable of enhancing the reliability of data recording/reproducing while maintaining compatibility with an existing error correction coding (ECC) format.

Additional aspects and/or advantages of the invention will be set forth in part in the description which follows and, in part, will be obvious from the description, or may be learned by practice of the invention.

According to an aspect of the present invention, there is provided an information recording medium comprising a data area to record data; and an area to record information indicating whether extra error correction coding (ECC) is applied with respect to data to be recorded on the information recording medium.

According to another aspect of the present invention, there is provided an information recording medium comprising a data area to record user data; and an area to record a data block including an extra parity generated by applying extra error correction coding (ECC) with respect to user data to be recorded on the information recording medium.

According to another aspect of the present invention, the information recording medium further includes an area to record extra ECC management information to manage the extra ECC.

According to another aspect of the present invention, the extra ECC management information includes at least one of extra EEC definition information and an extra ECC entry indicating mapping information between the user data to be recorded on the information recording medium and the data block including the extra parity.

According to another aspect of the present invention, the extra ECC entry includes at least one of location information indicating where the user data is recorded, location information indicating where the data block is recorded, and status information indicating a status of the extra ECC entry.

According to another aspect of the present invention, the status information includes at least one of information indicating whether the extra ECC entry is a single entry or a consecutive entry, information indicating whether the data block is generated according to an extra ECC application rate, and information indicating the number of user data blocks or sectors corresponding to the data block if the data block is not generated according to the extra ECC application rate.

According to another aspect of the present invention, the extra ECC definition information includes at least one of an extra ECC application rate, an extra ECC application method, information on a location of the area in which the data block is recorded, and information on a location of an area in which the extra ECC entry is recorded.

According to another aspect of the present invention, the area to record the data block is assigned to a part of a user data area when the information recording medium is initialized, or just before recording of the information recording medium is finalized.

According to another aspect of the present invention, an area for recording the extra ECC entry is assigned to an unused area of a lead-in area of the information recording medium or shares the area for recording the data block, and the area to record the extra ECC entry is assigned when the information recording medium is initialized, or just before recording of the information recording medium is finalized.

According to another aspect of the present invention, the extra ECC definition information is assigned to a lead-in area of the information recording medium.

According to another aspect of the present invention, the extra ECC definition information is contained in an unused reserved field of disc management information based on an existing specification.

According to another aspect of the present invention, the disc management information based on the existing specification includes at least one of recording management data (RMD) of a digital video disc (DVD), RMD or Defect Management Area (DMA) of a high definition digital video disc (HD DVD), and DMA of a Blu-ray disc (BD).

According to another aspect of the present invention, there is provided a method of operating an information recording medium comprising: determining whether extra error correction coding (ECC) is to be applied with respect to data to be recorded on the information recording medium, and an extra ECC application rate; assigning an area of the information recording medium to record a data block including an extra parity generated by applying the extra ECC to the data to be recorded on the information recording medium; assigning, to the information recording medium, an extra ECC management information area to record extra ECC management information to manage the extra ECC; and recording or updating the extra ECC management information in the extra ECC management information area.

According to another aspect of the present invention, there is provided a method of initializing an information recording medium comprising: determining whether extra ECC is to be applied to the information recording medium; if extra ECC is applied to the information recording medium, assigning an area of the information recording medium to record a data block including an extra parity generated by applying the extra ECC with respect to user data to be recorded on the information recording medium; assigning to the information recording medium an extra ECC management information area to recording extra ECC management information to manage the extra ECC; and recording information of about areas assigned to the information recording medium on the information recording medium.

According to another aspect of the present invention, there is provided a method of applying extra error correction coding (ECC) just before recording of an information recording medium is finalized, comprising: determining whether extra ECC is to be applied to the information recording medium; if extra ECC is applied to the information recording medium, assigning an unused area of the information recording medium to record a data block including an extra parity generated by applying the extra ECC with respect to user data to be recorded on the information recording medium; reading the user data recorded on the information recording medium; and recording the data block to the assigned area of the information recording medium.

According to another aspect of the present invention, there is provided a recording/reproducing apparatus to record/reproduce data to/from an information recording medium, comprising: a writing/reading unit to write/read the data in/from the information recording medium; and a controller arranged to control the writing/reading unit to determine whether extra error correction coding (ECC) is applied with respect to user data to be recorded on the information recording medium, to determine an extra ECC application rate, to assign an area of the information recording medium to recording a data block including an extra parity generated by applying the extra ECC with respect to the user data and an extra ECC management information area to record extra ECC management information to manage the extra ECC, and to record or update the extra ECC management information in the extra ECC management information area.

According to another aspect of the present invention, there is provided a recording/reproducing apparatus to initialize an information recording medium, comprising: a writing/reading unit to write/read data to/from the information recording medium; and a controller arranged to control the writing/reading unit to assign, when extra ECC is applied to the information recording medium, an area of the information recording medium to record a data block including an extra parity generated by applying the extra ECC with respect to user data to be recorded on the information recording medium, to assign to the information recording medium an extra ECC management information area for recording extra ECC management information for managing the extra ECC, and to record on the information recording medium information about areas assigned to the information recording medium.

According to another aspect of the present invention, there is provided a recording/reproducing apparatus to apply extra error correction coding (ECC) just before recording of an information recording medium is finalized, comprising: a writing/reading unit to write/read data to/from the information recording medium; and a controller arranged to control the writing/reading unit to assign, when extra ECC is applied to the information recording medium, to a part of a unused area of the information recording medium an area to recording a data block including an extra parity generated by applying the extra ECC with respect to user data to be recorded on the information recording medium, to read the user data and to record the data block in the assigned area of the information recording medium.

According to another aspect of the present invention, there is provided a method to record a data block including extra error correction coding (ECC) to an information storage medium in which an area to record extra ECC management information to manage the extra ECC is allocated. The method comprises generating a plurality of extra ECC blocks from an ECC block obtained by encoding user data; generating an extra parity ECC block using the plurality of extra ECC blocks; generating extra ECC management information, wherein the extra ECC management information includes information on extra ECC and a mapping relation between information on locations in which ECC blocks for user data are recorded and information on locations in which extra parity data blocks corresponding to the user data are recorded; recording the extra parity ECC blocks onto the information storage medium in an area allocated for user data; and recording the extra ECC management information onto the information storage medium in the area allocated for extra ECC management information.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
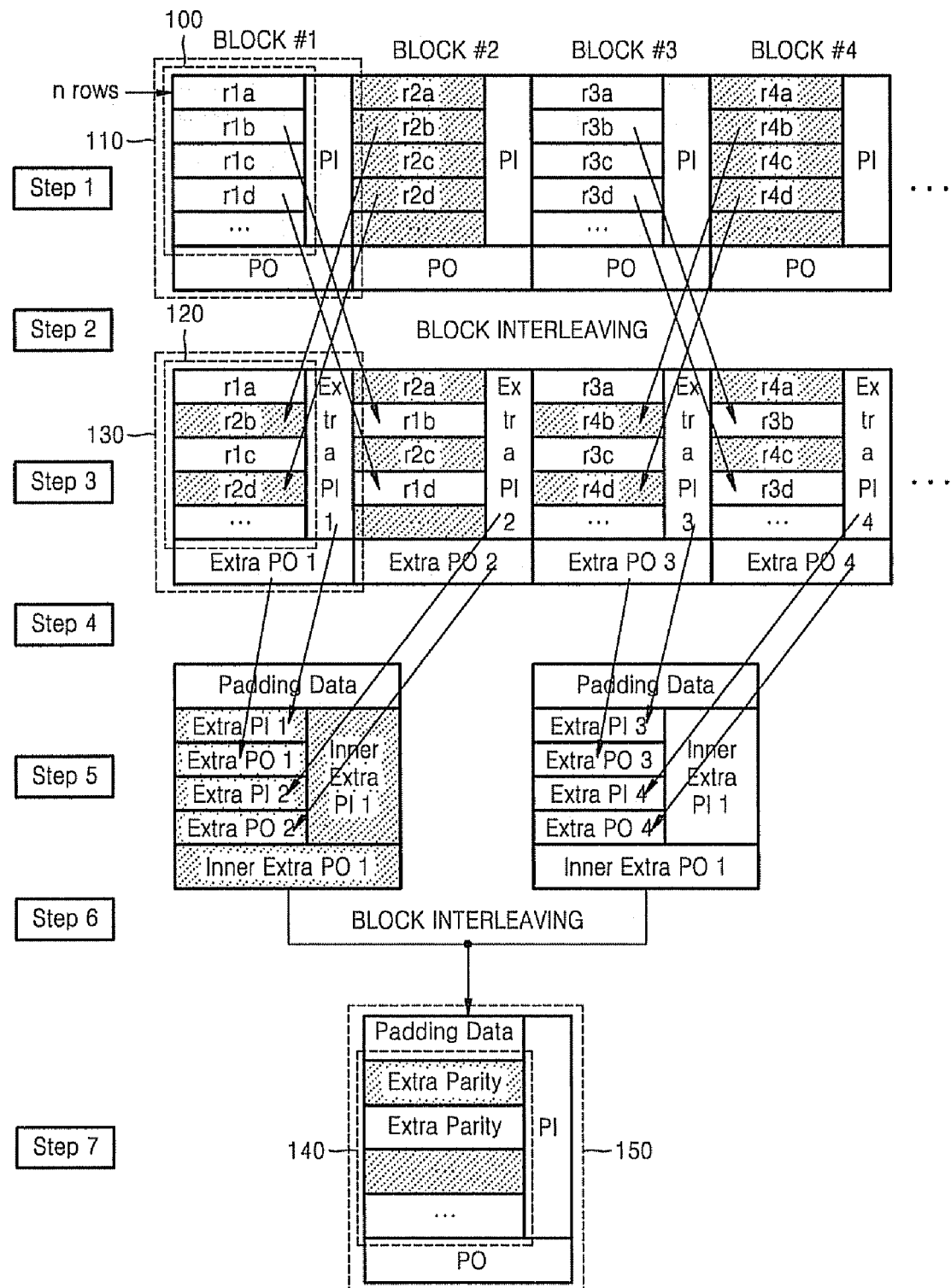
FIG. 1 is a view for explaining extra error correction coding (ECC) according to an example embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In order to avoid deterioration of data reliability while ensuring compatibility with existing standardized ECC formats, user data to be recorded is recorded as an existing standardized ECC block. Additionally, another block is created that includes error-correction parities (extra parities) generated by performing interleaving, etc. on the user data. In order to record a data block including such extra parities on an information recording medium and to restore the user data using the extra parities, two areas may be provided on the information recording medium: an area in which the data block including the extra parities is recorded, and an area to record information used to manage a mapping relation between an ECC block in which the user data is recorded and the data block including the extra parities.

FIG. 1 shows a technique to generate extra parities and extra parity ECC blocks in a Reed-Solomon Product Code (RSPC) format of DVD, according to an example embodiment of the present invention. Operations 1, 3, 5, and 7 represent operations to generate ECC blocks in the RSPC format, which is an existing standardized ECC format.

In operation 1, four ECC blocks, #1, #2, #3, and #4, are prepared. Each of the ECC blocks #1, #2, #3 and #4 includes an inner parity Pi and an outer parity PO are added. For example, the block #1 110 is an ECC block in which an inner parity PI and an outer parity PO are added to user data 100.

Operation 2 represents an operation to perform block interleaving in a unit of n rows with respect to the user data 100 of the ECC block #1 prepared in operation 1. In the example shown in FIG. 1, rows of even frames of the block #1 are exchanged with rows of even frames of the ECC block #2, and rows of even frames of the ECC block #3 are exchanged with rows of even frames of the ECC block #4. For example, a row 'r1b' of the ECC block #1 is exchanged with a row 'r2b' of the ECC block #2, and a row 'r3b' of the ECC block #3 is exchanged with a row 'r4b' of the block #4.

In operation 3, the ECC blocks #1, #2, #3, and #4 are converted into interleaved blocks with an existing RSPC format and the corresponding inner parities PIs and outer parities POs become extra parities. For example, as shown in FIG. 1, by adding extra parities PI 1 and PO 1 to an interleaved block (hereinafter referred to as an "extra ECC data block") 120, an extra ECC block 130 is generated.

In operation 4, one or more extra parities generated in operation 3, such as parities PO 1, PI 1, PO 2, and PI 2, are collected.

In operation 5, a plurality of ECC blocks with the existing RSPC format are generated using the extra parities collected in operation 4.

In operation 6, successive ECC blocks generated in operation 5 are then interleaved to generate an extra parity data block.

In operation 7, an extra parity ECC block 150 with the existing RSPC format is generated using the extra parity data block 140 generated in operation 6.

The reason why extra parities generated in operation 3 are constituted as an extra parity ECC block in operation 7, via operations 4, 5, and 6, is to improve reliability of reproducing an extra ECC block. This is because extra parities can be restored by inner extra parities PIs and outer extra parities POs generated in operation 5 when an extra ECC block is not error-corrected. Since errors generated in the extra ECC data block 150 of operation 7 are distributed to the ECC blocks created in operation 5, the probability of successful error correction increases. Operations 5 and 6 may be skipped, and are thus not illustrated in FIG. 1; an extra parity ECC block can be generated directly in operation 7 from the extra parities generated in operation 3.

A user data recovery method using extra parities will be described in detail.

Generally, burst errors, such as scratches, are generated in a track direction and approximately 1.5 to 5 ECC blocks are recorded in each track.

For example, the following situations may be assumed.

Assumption #1: A maximum burst error correction length of a DVD RSPC format is about 6.4 mm (16 rows).

Assumption #2: Burst errors corresponding to a length of about 12.8 mm (32 rows) are generated in a track direction.

Assumption #3: No errors, other than burst errors, are generated.

Assumption #4: An ECC block #1 and an ECC block #2 are recorded in a track.

If the burst errors of the above assumption #2 are not divided so as to correct two ECC blocks, at least one of the two ECC blocks cannot be error-corrected. If an ECC block which cannot be error-corrected is the ECC block #1, user data included in the ECC block #1 is recovered as follows.

A drive system recognizes that the ECC block #1 cannot be corrected based on error correction results of the ECC block #1 and the ECC block #2, reproduces the extra parity ECC block in which the extra parities corresponding to the ECC block #1 and the ECC block #2 are recorded, and obtains the extra parities.

Block interleaving is performed on user data of the ECC blocks #1 and #2 that are subjected to error correction, as in operation 2 of FIG. 1, and two interleaved blocks are generated. Then, the extra parities obtained from the extra parity ECC block are disposed to the corresponding locations of the extra ECC block so that two extra ECC blocks are generated. The extra ECC blocks are subjected to error correction and user data of the extra ECC blocks is de-interleaved in an inverse order of operation 2 of FIG. 1 so that user data of the ECC blocks #1 and #2 is recovered.

The user data is recovered for the following reasons. The user data of the ECC block #2 is already corrected. Errors included in the user data of the ECC block #1 are divided into two blocks interleaved in operation 2 using block interleaving. Accordingly, each of the two interleaved ECC blocks has at most errors in 16 rows. Since the DVD RSPC format can correct PI errors corresponding to 16 rows by erasure correction in a PO direction, both the two interleaved ECC blocks can be corrected.

Figure 2:
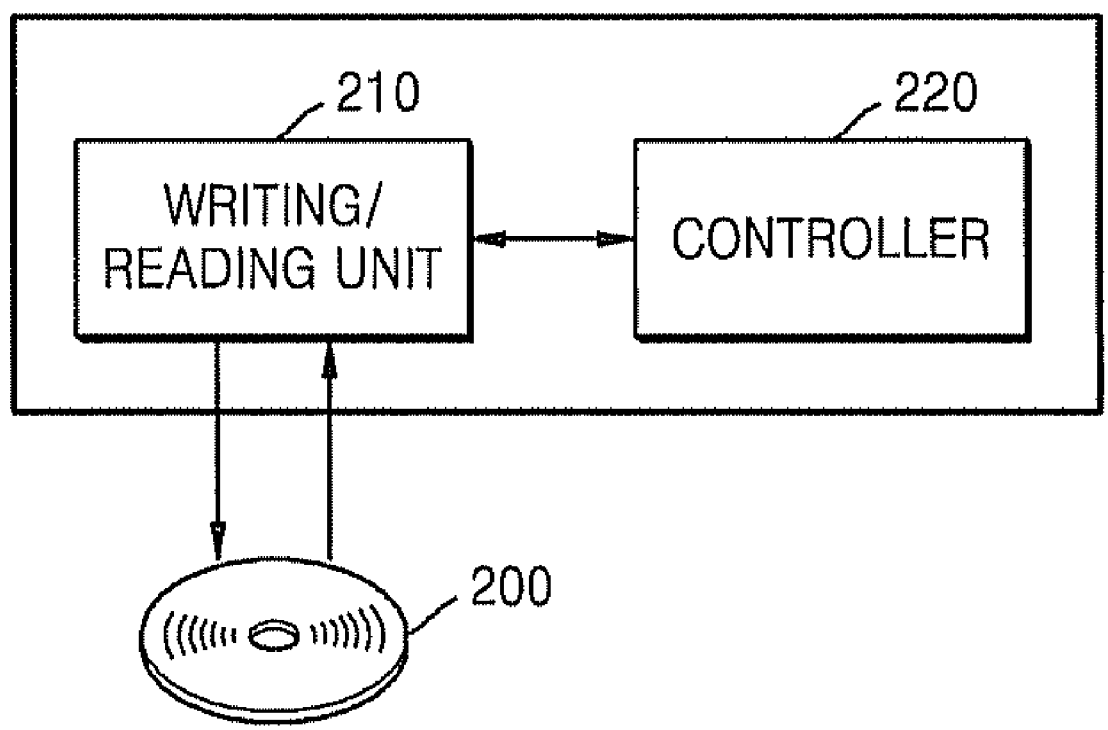
FIG. 2 is a block diagram of an apparatus for recording/reproducing data in/from an information recording medium to which the extra ECC is applied, according to an example embodiment of the present invention.

FIG. 2 is a block diagram of an apparatus for recording/reproducing data to/from an information recording medium 200 to which extra ECC is applied, according to an embodiment of the present invention. The recording/reproducing apparatus includes a writing/reading unit 210, which records/reads data to/from the information recording medium 200 to which extra ECC is applied; and a controller 220, which controls the writing/reading unit 210, including to encode data to be recorded on the information recording medium 200 and to decode data read from the information recording medium 200.

For purposes of brevity, the recording/reproducing apparatus as shown in FIG. 2, albeit in whole or in part, can also be referred to as a drive system which can be internal (housed within a host) or external (housed in a separate box that connects to a host). In addition, the recording/reproducing apparatus as shown in FIG. 2 may be a single apparatus or may be separated into a recording apparatus (i.e., recorder) and a reading apparatus (i.e., player).

The controller 220 encodes user data received from a host (not shown) as an ECC block so as to record the user data on the information recording medium 200 and decodes an ECC block read from the information recording medium 200, via the writing/reading unit 210. In particular, according to an example embodiment of the present invention, the controller 200 encodes user data to be recorded on the information recording medium 100 using extra ECC and decodes data read from the information recording medium 200 using extra ECC.

When extra ECC is to be applied, the controller 220 generates an extra ECC data block from an ECC block obtained by encoding user data and generates an extra ECC block by adding an extra parity to the extra ECC data block.

Then, the controller 220 collects extra parities of one or more extra blocks (for example, N extra ECC blocks,) performs interleaving according to a predetermined interleaving method, and generates an extra parity data block. An extra parity ECC block is then generated by performing error correcting coding (ECC) on the extra parity data block and adding parities to the result of the error-correction. The extra parity ECC block may be recorded when data is recorded. In order to increase the reliability of reproducing extra parities, extra parity ECC blocks obtained by performing ECC on data consisting of extra parities may be recorded. When decoding is performed using extra ECC, since the decoding is actually performed on extra parities, it may become necessary, in order to utilize the extra ECC, to record such extra parities using an arbitrary format on an information recording medium. Accordingly, to apply the extra ECC, extra parities or extra parity data blocks are recorded on the information recording medium.

When user data is recorded, if it has been not determined in advance whether extra ECC is to be applied or if an application rate of the extra ECC has been set, the controller 220 determines whether extra ECC is to be applied and sets an application rate of the extra ECC, via a user interface. If the extra ECC is applied, the controller 220 assigns and manages an area to record the extra parity ECC block and extra ECC management information. The controller 220 also controls the generation of the extra parity ECC block according to the application rate of the extra ECC when the user data is recorded and manages the recording of the extra parity ECC block and the update and recording of the extra ECC management information.

When data is reproduced, the controller 220 determines whether the information recording medium 200 is an information recording medium to which extra ECC has been applied. If the information recording medium 200 is an information recording medium to which extra ECC has been applied, the controller 220 determines whether the data must be reproduced using extra ECC. If it has been not determined in advance whether the data must be reproduced using extra ECC, the controller 220 determines whether the data must be reproduced using extra ECC, for example, via the user interface. If the data must be reproduced using extra ECC, the controller 220 controls the writing/reading unit 210 to read extra ECC management information. The controller 220 obtains information regarding extra ECC, location information of extra parity ECC blocks for ECC blocks that are to be reproduced, etc., from the extra ECC management information.

After obtaining information from the extra ECC management information, the controller 220 deinterleaves an extra parity data block obtained by performing error correction on an extra parity ECC block read from the information recording medium 200, according to a predetermined deinterleaving method, thus extracting N corresponding extra parities. The controller 220 generates an extra ECC data block from an ECC block that is to be reproduced, combines extra parities corresponding to the ECC block among the extracted N extra parities with the extra ECC data block, forms an extra ECC block, and performs error correction on the extra ECC block. The controller 220 then updates, in the corresponding ECC block, the extra ECC data block in the error-corrected extra ECC block.

Although the extra parity data block is generated from at least one ECC block for the user data, aspects of the present invention are not limited to this. The basic reason to record an extra parity data block in an information recording medium together with user data is to restore the user data using extra parities included in a separate extra parity data block to restore the user data when the user data cannot be restored by an existing error correction system. Accordingly, an example embodiment of the present invention constructs an extra ECC data block, generates an extra ECC block (either by extracting a part of the user data itself or from data resulting from transforming user data by a series of process steps, such as scrambling,) collects extra parities of the extra ECC block, and constructs an extra parity data block.

Figure 3:
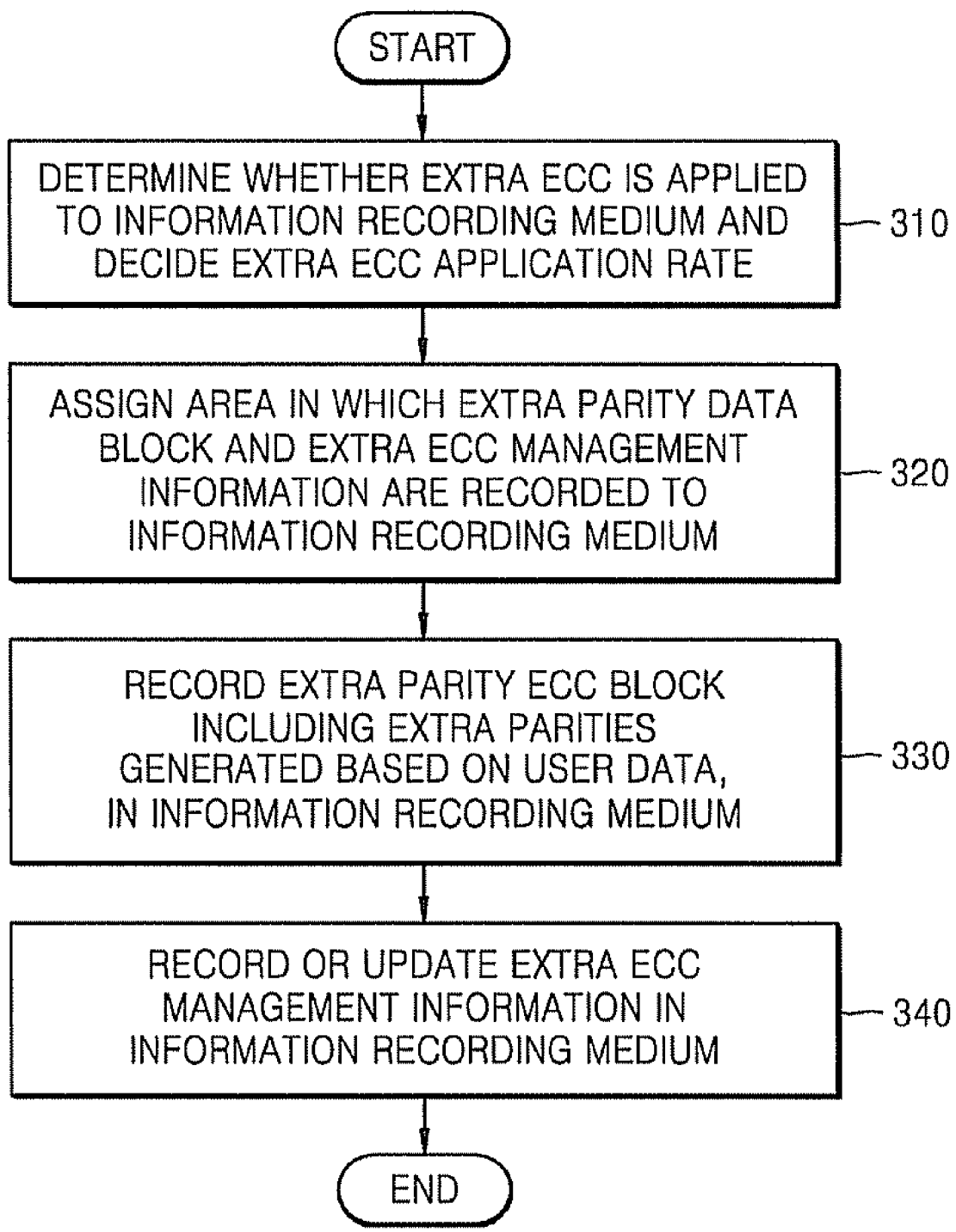
FIG. 3 is a flowchart illustrating a method of recording data in an information recording medium using the extra ECC, according to an example embodiment of the present invention.

FIG. 3 is a flowchart illustrating a method of recording data in an information recording medium using the extra ECC, according to an example embodiment of the present invention. First, the controller 220 determines whether extra ECC is applied to an information recording medium 200 (operation 310). Whether data must be encoded using extra ECC is determined when the data is recorded on the information recording medium 200. If it is determined that extra ECC is applied, an application rate of the extra ECC is decided.

The greater the application rate of the extra ECC, the wider the area required to record an extra parity data block. For example, if the extra ECC application rate is 1/N, an extra parity data block is generated from N user data blocks. In the case of DVD RSPC, since the corresponding extra ECC application rate is about 13%, extra parities for N blocks are about N*13%. If it is assumed that an extra parity ECC block obtained by performing ECC using the extra parities as user data is 100%, 13% of the 100% is assigned to ECC and the remaining 87% can be assigned to a user data part, that is, extra parities for N blocks. However, since the extra parities for the N user data blocks are N*13% as described above, N*13% must be within 87%. Therefore, N is a maximum of 6 (6*13%=78%.) If only outer parities PO are used as extra parities, N can increase. In the case of inner parities PI, inner parities PI can be used in step 3 of FIG. 1 in order to restore inner parities PI generated in step 1 of FIG. 1. Therefore, since an area corresponding to ⅙ of the entire user data is required, reduce a user data area may be reduced and a recordable area near the outer circumference of a disc may be assigned to extra parity ECC blocks. Also, area location information and/or size information may be stored after the assignment operation.

The controller 220 next assigns an area of the information recording medium 200 in which the extra parity data block and the extra ECC management information is to be recorded (operation 320). Then, the controller 220 generates an extra ECC block and extra parities based on user data. The controller 220 successively generates extra parity data blocks according to the technique shown in FIG. 1. The controller 220 controls the writing/reading unit 210 so that the extra parity ECC block is recorded in the assigned area of the information recording medium 200 (operation 330). In order to ensure reliability of data reproduction, an extra parity ECC block generated by performing ECC may be recorded on the extra parity data block.

The controller 220 then generates extra ECC management information. The extra ECC management information includes information regarding extra ECC and information indicating a mapping relation between information on locations in which ECC blocks for user data are recorded and information on locations in which extra parity data blocks corresponding to the user data are recorded. The information regarding extra ECC includes information indicating whether extra ECC is applied, information indicating an application rate of extra ECC, information on the location and/or size of an area assigned to record extra parity data blocks and extra ECC management information, etc. The controller 220 may also control the writing/reading unit 210 so that the extra ECC management information is recorded in an assigned area of the information recording medium 200 (operation 340). The extra ECC management information will be described in detail later.

Area assignment is not limited to assignment of a consecutive area. For example, when an extra ECC management area is assigned, an area to record extra ECC definition information and an area for recording an extra ECC entry list can be assigned to the same area or to separate areas. The extra ECC definition information area can be assigned to a lead-in area of the information recording medium 200 and the extra ECC entry list can be assigned to a user data area of the information recording medium 200 or near the outer circumference of the information recording medium 200. It is also possible to assign both an area in which data blocks including extra parities are recorded and an area in which extra ECC definition information is recorded to the user data area or near the outer circumference of the information recording medium 200. Assigning an extra ECC management area (EEMA) and an extra ECC block recording area (EEBRA) means that a physical area in which data blocks including extra ECC definition information (EEDI), an extra ECC entry list (EEL), and extra parities are recorded is prepared on the information recording medium 200. Also, location information of the assigned areas may be stored in respective fields of the EEDI.

The operations of determining whether extra ECC is applied and determining the extra ECC application rate and the operation of assigning areas to the information recording medium 200 according to the extra ECC application can be performed either when an empty information recording medium 200 is loaded in a drive and the information recording medium 200 is initialized, or just before recording of the information recording medium 200 is finalized after all data has been recorded on the information recording medium 200. If extra ECC is applied before recording of the information recording medium 200 is finalized, it is determined whether extra ECC is applied and an extra ECC application rate is set, taking into account the remaining user data area or the extra area of the information recording medium 200. Then, desired areas are assigned according to the extra ECC application rate. User data recorded on the information recording medium 200 is read, and an extra parity ECC block for the read user data is generated. The extra parity ECC block is recorded on the information recording medium 200. Extra ECC definition information (EEDI) and an extra ECC entry list (EEL), including information required for extra ECC, are also recorded on the information recording medium 200. Then, recording of the information recording medium 200 is finalized.

Figure 4:
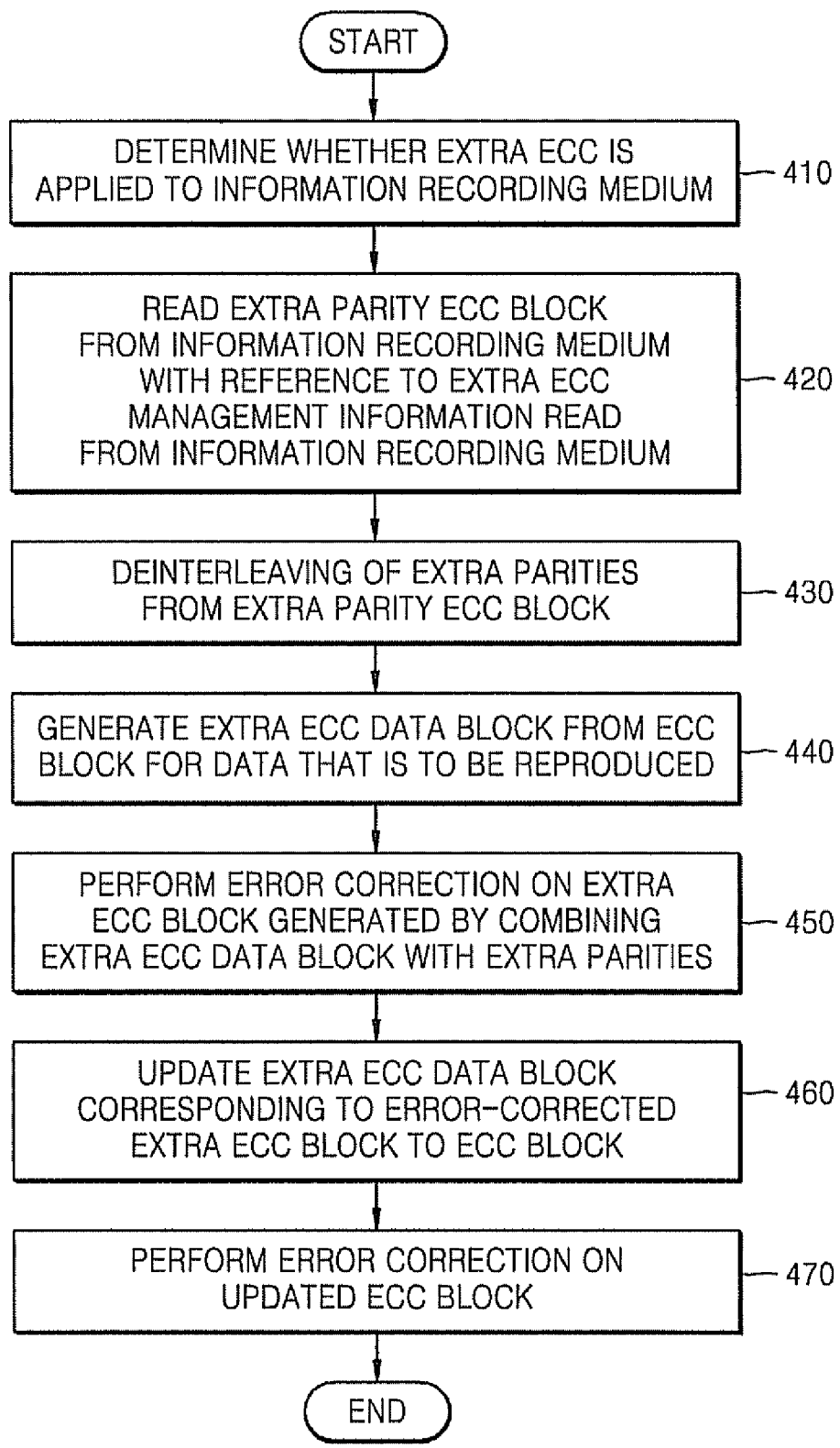
FIG. 4 is a flowchart illustrating a method of reproducing data from an information recording medium using the extra ECC, according to an example embodiment of the present invention.

FIG. 4 is a flowchart illustrating a method of reproducing data from an information recording medium using the extra ECC, according to an embodiment of the present invention. First, the controller 220 determines whether extra ECC has been applied to the information recording medium 200 (operation 410). That is, the controller 220 determines whether data has been recorded using extra ECC on the information recording medium 200 and whether the data must be reproduced using extra ECC from the information recording medium 200.

If the data must be reproduced using extra ECC from the information recording medium 200, the controller 220 controls the writing/reading unit 210 to read extra ECC management information from a predetermined area of the information recording medium 200. The extra ECC management information includes a mapping relation between information on locations where user data is recorded and information on locations where the corresponding extra parity data blocks or extra parity ECC blocks are recorded. The writing/reading unit 210, under the control of the controller 200, reads an extra parity ECC block from the information recording medium 200, with reference to the extra ECC management information (operation 420). Then, the controller 220 obtains an extra parity data block by performing error correction on the extra parity ECC block and obtains extra parities by deinterleaving the extra parity data block (operation 430).

In operation 440, the controller 220 generates an extra ECC data block for the data to be reproduced from the ECC block. The controller 220 successively generates extra ECC blocks by combining the extra ECC data block with the extra parities and performs error correction on the extra ECC blocks (operation 450). The controller 220 next updates to the corresponding ECC block an extra ECC data block corresponding to the error-corrected extra ECC block (operation 460). Finally, the controller 220 performs error correction on the updated ECC block and obtains user data that is to be reproduced (operation 470).

Figure 5:
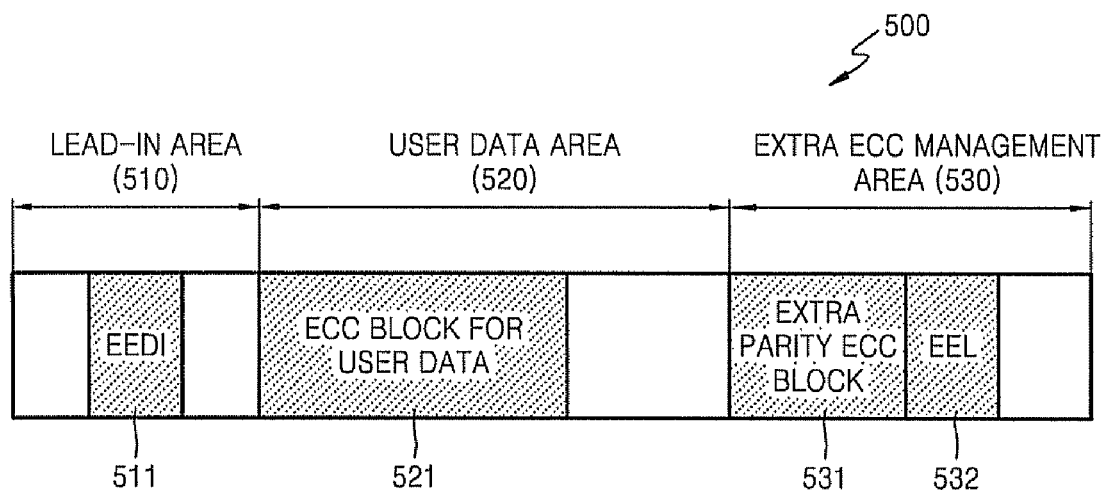
FIG. 5 illustrates a layout of an information recording medium to which extra ECC is applied, according to an example embodiment of the present invention.

FIG. 5 illustrates a layout of an information recording medium 500 to which extra ECC is applied, according to an example embodiment of the present invention. The information recording medium 500 includes a lead-in area 510, a user data area 520, and an extra ECC management area 530.

The lead-in area 510 is used to record information related to the information recording medium 500 or information related to user data recording. The lead-in area 510 includes an area 511 in which extra ECC definition information (EEDI) is recorded. However, according to other aspects of the present invention, the area 511 in which the EEDI is recorded can be prepared in another area. The user data area 520 is used to record user data. In FIG. 5, an ECC block 521 for user data is recorded in the user data area 520.

The extra ECC management area 530 is used to record information related to extra ECC and can be prepared separately from the user data area 520, as shown in FIG. 5. The extra ECC management area 530 may also be prepared as a part of the user data area 520, taking into account compatibility with existing information recording media and the lack of separate extra space on the information recording medium 500. The extra ECC management area 530 includes an area 531 in which extra parity ECC blocks are recorded and an area 532 in which an extra ECC entry list is recorded.

Figure 6:
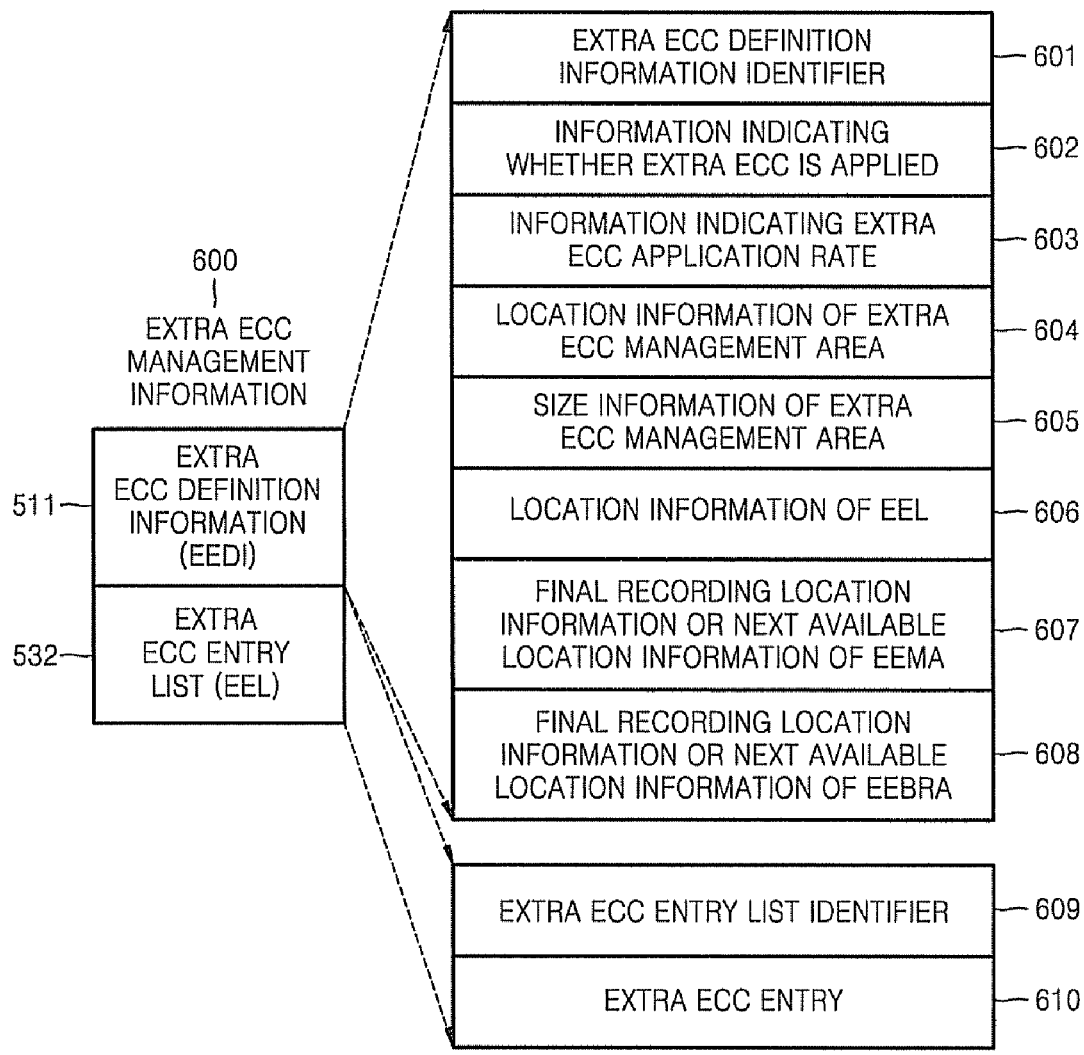
FIG. 6 illustrates details of extra ECC management information (extra ECC definition information and an extra ECC entry list) illustrated in FIG. 5.

FIG. 6 illustrates details of extra ECC management information 600, EEDI and an extra ECC entry list (EEL), illustrated in FIG. 5. Referring to FIGS. 5 and 6, the extra ECC management information 600 includes EEDI 511 and an EEL 532.

The extra ECC definition information 511 includes an extra ECC definition information identifier 601, information 602 indicating whether extra ECC is applied, information 603 indicating an extra ECC application rate, information 604 on the location of an extra ECC management area, size information 605 of the extra ECC management area, information 606 on a location in which EEL is recorded, final recording location information or next available location information 607 of an EEMA, and final recording location information or next available location information 608 of an EEBRA. The extra ECC definition information identifier 601 identifies extra ECC definition information.

The information 602 indicating whether extra ECC is applied indicates whether extra ECC is applied to the information recording medium 500. The information 603 indicating the extra ECC application rate represents an application rate of the extra EEC applied to the information recording medium 500. Also, although not illustrated in FIG. 6, the extra ECC definition information can further include information regarding a method in which extra ECC is applied. The information regarding the extra ECC application method represents information regarding whether functions related to extra ECC are performed by a physical drive, by a file system drive, or by both the physical drive and file system drive.

The extra ECC definition information 511 includes basic information on extra ECC and location information to point out different areas where information is stored on the information recording medium 200. The area for the extra ECC definition information may be assigned to a region that the drive can access easily. In particular, in the case of a write-once recording medium, when information is updated, location information about an area in which the final information is recorded is changed. Accordingly, the extra ECC definition information may be recorded in a location that the drive can easily recognize, such as in the lead-in area 510 or in a specific area of the user data area 520. For example, a rule that extra ECC definition information is always recorded in a final recording block of an arbitrary area can be set. By locating extra ECC definition information in recording management data of a DVD and recording the extra ECC definition information in a recording management area (RMA) when recording management data (RMD), the extra ECC definition information can be easily accessed later and will be compatible with existing information recording media.

The extra ECC entry list 532 includes an extra ECC entry list identifier 609 identifying an extra ECC entry list and an extra ECC entry 610 representing a connection between a user data block and an extra parity ECC block.

Figure 7:
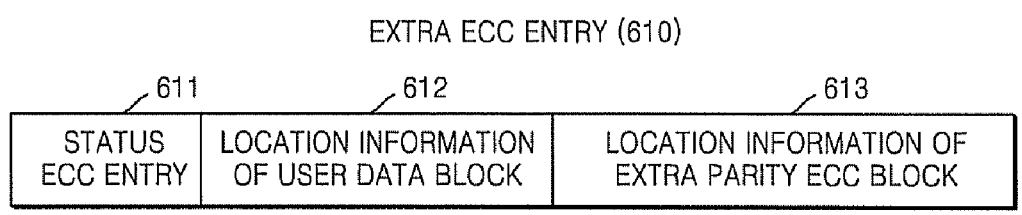
FIG. 7 illustrates details of an extra ECC entry illustrated in FIG. 6.

FIG. 7 illustrates details of the extra ECC entry 610 illustrated in FIG. 6. Referring to FIG. 7, the extra ECC entry 610 includes status information 611, user data block location information 612, and extra parity ECC block location information 613.

The status information 610 includes: (1) information indicating whether an extra ECC entry is a single entry or a consecutive entry, (2) information indicating whether the extra ECC entry is complete or incomplete, and (3) if the extra ECC entry is incomplete, information on the number of user data blocks or sectors to represent an extra ECC application rate.

1) The information indicating whether the extra ECC entry is the single entry or the consecutive entry. Single entry refers to an entry representing an extra parity ECC block. Consecutive entry refers to a pair of entries (a start entry and a final entry) representing a plurality of extra parity ECC blocks when the plurality of extra parity ECC blocks are consecutively recorded. The start entry and the final entry are stored consecutively. For consecutive entries, the status information indicates whether the corresponding entry is a start entry or a final entry of the consecutive entry.

2) The information indicating whether the extra ECC entry is complete or incomplete. For example, if an extra ECC application rate is 1/6, the extra ECC entry is "complete" if the extra ECC entry represents that an extra parity ECC block is generated for 6 user data blocks, and the extra ECC entry is "incomplete" if the extra ECC entry represents that an extra parity ECC block is generated for 4 user data blocks, or fewer than 6 data blocks.

3) The information about the number of user data blocks or sectors to represent the extra ECC application rate. If the extra ECC entry is incomplete, information about the number of user data blocks or sectors is provided in order to represent an extra ECC application rate. In the above example, if an extra parity ECC block for 4 user data blocks is generated, the information number is "4". Also, if the extra ECC entry is complete, the corresponding information field may be set to "0".

The user data block location information 612 indicates the location of a first data block among M consecutive user data blocks, when an extra parity ECC block is generated by the M consecutive user data blocks. The extra parity ECC block location information 613 indicates the location in which the extra parity ECC block is recorded, when an extra parity ECC block is generated by M consecutive user data blocks.

If an extra ECC application rate is 1/6, connection information between user data blocks and an extra parity ECC block is interpreted from extra ECC entries, as follows.

If a status information field is "complete" and a single entry is provided, locations of extra parities for a block designated by a "user data block location information" field and the following consecutive 6 user data blocks are recorded in an "extra parity ECC block location information" field.

If a status information field is "incomplete", the number of user data blocks is set to 4 (or another number), and a single entry is provided. Locations of extra parities for a block designated by a "user data block location information" field and the following consecutive 4 user data blocks are recorded in an "extra parity ECC block location information" field.

If the status information field is "consecutive" and extra parity ECC blocks for consecutive user data blocks are consecutively recorded, then connection information for the corresponding consecutive interval can be represented by two entries. That is, a "user data block location information" field of a start entry indicates the location of a first block of anterior 6 blocks of the consecutive user data blocks and an "extra parity ECC block location information" field of the start entry indicates the location of an extra parity ECC block for the anterior 6 blocks of the user data blocks. A "user data block location information" field of a final entry indicates the location of a first block of posterior 6 blocks of the user data blocks and an "extra parity ECC block location information" field of the final entry indicates the location of an extra parity ECC block for the posterior 6 blocks.

An embodiment in which extra ECC is applied in order to ensure reproduction compatibility with a DVD-R/RW will be described. In DVD-R/RW, recording management data (RMD) to record and manage data to be recorded in an information recording medium is prepared. The extra ECC definition information according to an embodiment of the present invention can be recorded in a recording management area (RMA) together with RMD when data is recorded, using reserved fields of the RMD. When extra ECC is not recorded on the information recording medium, all values of EEDI information fields assigned in the RMD are set to values indicating that the EEDI information fields are reserved fields. Generally, all bytes of a reserved field are set to '00h'. However, if extra ECC is applied, an extra ECC application rate is set in the reserved fields.

The extra ECC entry list can use a reserved area of the RMD. If the reserved area is insufficient, an area in which the extra ECC list is recorded can be assigned to a user data area or near the outer circumference of the information recording medium. If extra ECC is applied to the DVD-R/RW, the extra ECC can be applied when an empty disc is initialized or finalized.

1) Extra ECC is applied when the empty disc is initialized:

The wider the area required to record an extra parity ECC block, the greater the extra ECC application rate. For example, if the extra ECC application rate is 1/N, this means that an extra parity ECC block is generated from N user data blocks. In DVD RSPC, since an ECC application rate is about 13%, extra parities for N blocks is N*13%. ECC application rate means an amount of ECC parities added to user data. When user data is 100%, ECC parities corresponding to 13% of user data is added to the user data. Accordingly, by ECC-encoding the extra parities of N*13%, N*13% must not exceed 87%. Therefore, N is a maximum of 6. If only outer parities POs are used as extra parities, N can increase. In the case of inner parities PIs, PIs can be used in operation 3 of FIG. 1 to restore PIs generated in operation 1 of FIG. 1. Therefore, since an area corresponding to ⅙ of an entire user data area is required, the user data area may be reduced and a recordable area near the outer circumference of a disc may be assigned to extra parity ECC blocks. Also, area location information and/or size information of the assigned areas after area assignment has been performed may be added to the extra ECC definition information.

The area in which the extra ECC entry list is recorded can be assigned to the RMA together with the RMD by preparing a storage space for the EEL in the RMD. Or, a final extra ECC entry list, obtained by recording and updating extra ECC blocks in an area assigned to record extra parity ECC blocks, may be recorded in a block following the area in which the extra parity ECC blocks are recorded. As such, the extra ECC entry list may be recorded in the area in which extra parity ECC blocks are recorded. Location information of the extra ECC entry list may be included in the EEDI.

2) Extra ECC is applied before finishing:

Extra ECC can be applied just before recording of an information recording medium is finalized, after user data is completely recorded on the information recording medium. In this case, an area in which extra parity ECC blocks are recorded is assigned to the remaining user data area of the information recording medium before finalizing. An area in which the extra ECC entry list is recorded can share the area in which the extra parity ECC blocks are recorded, or use a reserved field of the RMD. An extra ECC application rate is determined based on the remaining user data area and an extra ECC application method is determined based on the extra ECC application rate. If the extra ECC application rate and the extra ECC application method are determined, extra parities are generated from user data stored on the information recording medium by a processing technique such as block interleaving, ECC is performed, and an extra parity ECC block is recorded in its assigned area. After the extra parity ECC block is recorded, an extra ECC entry is generated and an extra ECC entry list (including the extra ECC entry) is recorded on the information recording medium. If the operation to update the extra parity ECC block and the extra ECC entry list is terminated, the corresponding extra ECC definition information is updated as necessary in order to reflect a final status. Extra ECC management information, such as the extra ECC definition information and the extra ECC entry list, may be recorded repeatedly to improve performance robustness. When the series of operations for extra ECC is terminated, the recording is finalized.

The recording/reproducing method can also be embodied as computer readable codes on a computer readable recording medium. The computer readable recording medium may be any data storage device that can store data which can be thereafter read by a computer system. Examples of computer readable recording media include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

As described above, according to aspects of the present invention, by generating extra parities and recording a block including the extra parities in an information recording medium, it is possible to restore user data in a non-corrected error correction block using the extra parities recorded on the information recording medium when an error correction block for user data cannot be otherwise error-corrected. In the case of RSPC of DVD, a burst error length can be corrected is about 16 rows. However, according to aspects of the present invention, even when consecutive errors of 32 rows are generated, user data in the corresponding error correction block can be restored.

Also, by assigning an area used for application of extra ECC to an area not used in existing specifications, recording of extra ECC and recording of user data can be performed simultaneously. Accordingly, although a disc in which extra ECC is recorded is loaded in a different drive, that is, in a drive which does not support extra ECC, user data is recorded normally. Also, since extra ECC is applied using parts not used in existing specifications, reproduction compatibility is ensured. Although a user data block cannot be reproduced in a drive to which extra ECC is applied, the user data can be restored using extra parities. However, in a drive which does not support extra ECC, although a disc to which extra ECC is applied is loaded, it is impossible to restore user data with errors. Also, in the extra ECC operation method and extra parity ECC block generating method according to aspects of the present invention, it is possible to maintain reproduction compatibility with existing devices.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, generation of extra parity ECC blocks may be done at any point during a process of recording user data onto an information recording medium. Accordingly, it is intended, therefore, that the present invention not be limited to the various example embodiments disclosed, but that the present invention includes all embodiments falling within the scope of the appended claims.

What is claimed is:

1. An information recording medium comprising:
a data area to record user data; and
an area to record information indicating whether extra error correction coding (ECC) is applied with respect to the user data to be recorded on the information recording medium;
wherein the extra ECC is executed by interleaving rows of initial error correction coded user data.

2. An information recording medium comprising:
a data area to record user data; and
an area to record a data block including an extra parity generated by applying extra error correction coding (ECC) with respect to the user data to be recorded on the information recording medium;
wherein the extra ECC is executed by interleaving rows of initial error correction coded user data.

3. The information recording medium of claim 2, further comprising an area to record extra ECC management information to manage the extra ECC.

4. The information recording medium of claim 3, wherein the extra ECC management information includes at least one of extra EEC definition information and an extra ECC entry indicating mapping information between the user data to be recorded on the information recording medium and the data block including the extra parity.

5. The information recording medium of claim 4, wherein the extra ECC entry includes at least one of location information indicating where the user data is recorded, location information indicating where the data block is recorded, and status information indicating a status of the extra ECC entry.

6. The information recording medium of claim 5, wherein the status information includes at least one of information indicating whether the extra ECC entry is a single entry or a consecutive entry, information indicating whether the data block is generated according to an extra ECC application rate, and information indicating the number of user data blocks or sectors corresponding to the data block if the data block is not generated according to the extra ECC application rate.

7. The information recording medium of claim 4, wherein the extra ECC definition information includes at least one of an extra ECC application rate, an extra ECC application method, information on a location of an area where the data block is recorded, and information on a location of the area where the extra ECC entry is recorded.

8. The information recording medium of claim 2, wherein the area to record the data block is assigned to a part of a user data area when the information recording medium is initialized, or just before recording of the information recording medium is finalized.

9. The information recording medium of claim 4, wherein:
an area to record the extra ECC entry is assigned to an unused area of a lead-in area of the information recording medium or shares the area for recording the data block; and
the area to record the extra ECC entry is assigned when the information recording medium is initialized, or just before recording of the information recording medium is finalized.

10. The information recording medium of claim 4, wherein the extra ECC definition information is assigned to a lead-in area of the information recording medium.

11. The information recording medium of claim 10, wherein the extra ECC definition information is contained in an unused reserved field of disc management information based on an existing specification.

12. The information recording medium of claim 11, wherein the disc management information based on the existing specification includes at least one of recording management data (RMD) of a digital video disc (DVD), RMD or Defect Management Area (DMA) of a high definition digital video disc (HD DVD), and DMA of a Blu-ray disc (BD).

13. A method of recording an information recording medium comprising:
determining whether extra error correction coding (ECC) is to be applied with respect to data to be recorded on the information recording medium, and an extra ECC application rate;
assigning an area of the information recording medium to record a data block including an extra parity generated by applying the extra ECC to the data to be recorded on the information recording medium;
wherein the extra ECC is executed by interleaving rows of initial error correction coded user data;
assigning, to the information recording medium, an extra ECC management information area to record extra ECC management information to manage the extra ECC; and
recording or updating the extra ECC management information in the extra ECC management information area.

14. The method of claim 13, wherein the determining of whether the extra ECC is applied and the deciding of the extra ECC application rate are performed when the information recording medium is initialized, or just before recording of the information recording medium is finalized.

15. The method of claim 13, wherein the assigning of the area to record the data block including the extra parity comprises assigning the area to record the data block including the extra parity to at least one part of a user data area of the information recording medium.

16. The method of claim 13, wherein the assigning of the extra ECC management information area to the information recording medium comprises assigning the extra ECC management area to a lead-in area of the information recording medium, to a part of a user data area of the information recording medium, or to both the lead-in area and the user data area of the information recording medium.

17. The method of claim 13, wherein the extra ECC definition information is contained in an unused reserved field among disc management information fields based on an existing specification.

18. A method of initializing an information recording medium comprising:

determining whether extra ECC is to be applied to the information recording medium;

if the extra ECC is applied to the information recording medium, assigning an area of the information recording medium to record a data block including an extra parity generated by applying the extra ECC with respect to user data to be recorded on the information recording medium;

wherein the extra ECC is executed by interleaving rows of initial error correction coded user data;

assigning to the information recording medium an extra ECC management information area to record extra ECC management information to manage the extra ECC; and recording information about areas assigned to the information recording medium on the information recording medium.

19. A method of applying extra error correction coding (ECC) just before recording of an information recording medium is finalized, comprising:

determining whether extra ECC is to be applied to the information recording medium;

if the extra ECC is applied to the information recording medium, assigning an unused area of the information recording medium to record a data block including an extra parity generated by applying the extra ECC with respect to user data to be recorded on the information recording medium;

wherein the extra ECC is executed by interleaving rows of initial error correction coded user data;

reading the user data recorded on the information recording medium; and recording the data block to the assigned area of the information recording medium.

20. A recording/reproducing apparatus to record/reproduce data to/from an information recording medium, comprising:

a writing/reading unit to write/read data to/from the information recording medium; and a controller arranged to control the writing/reading unit to determine whether extra error correction coding (ECC) is applied with respect to user data to be recorded on the information recording medium, to determine an extra ECC application rate, to assign an area of the information recording medium to record a data block including an extra parity generated by applying the extra ECC with respect to the user data and an extra ECC management information area to record the extra ECC management information to manage the extra ECC, and to record or update the extra ECC management information in the extra ECC management information area;

wherein the extra ECC is executed by interleaving rows of initial error correction coded user data.

21. The recording/reproducing apparatus of claim 20, wherein the controller determines whether the extra ECC is applied and determines the extra ECC application rate when the information recording medium is initialized, or just before recording of the information recording medium is finalized.

22. The recording/reproducing apparatus of claim 20, wherein the controller assigns the area to record the data block including the extra parity to at least one part of a user data area of the information recording medium.

23. The recording/reproducing apparatus of claim 20, wherein the controller assigns the extra ECC management information area to a lead-in area of the information recording medium, to a part of a user data area of the information recording medium, or to both the lead-in area and the user data area of the information recording medium.

24. The recording/reproducing apparatus of claim 20, wherein the extra ECC management information is contained in an unused reserved field among disc management information fields based on an existing specification.

25. A recording/reproducing apparatus to initialize an information recording medium, comprising:

a writing/reading unit to write/read data to/from the information recording medium; and a controller arranged to control the writing/reading unit to assign, when extra ECC is applied to the information recording medium, an area of the information recording medium to record a data block including an extra parity generated by applying the extra ECC with respect to user data to be recorded on the information recording medium, to assign, on the information recording medium, an extra ECC management information area to record extra ECC management information to manage the extra ECC, and to record on the information recording medium information about areas assigned to the information recording medium;

wherein the extra ECC is executed by interleaving rows of initial error correction coded user data.

26. A recording/reproducing apparatus to apply extra error correction coding (ECC) just before recording of an information recording medium is finalized, comprising:

a writing/reading unit to write/read data to/from the information recording medium; and a controller arranged to control the writing/reading unit to assign, when extra ECC is applied to the information recording medium, to a part of an unused area of the information recording medium an area to record a data block including an extra parity generated by applying the extra ECC with respect to user data to be recorded on the information recording medium, to read the user data, and to record the data block in the assigned area of the information recording medium;

wherein the extra ECC is executed by interleaving rows of initial error correction coded user data.

27. A method to generate an extra parity error correction coding (ECC) block, the method comprising:

generating a plurality of ECC blocks, each ECC block having an inner parity and an outer parity;

interleaving rows of each of the plurality of ECC blocks with rows of another of the plurality of ECC blocks to create a plurality of extra ECC blocks, each having extra parities;

collecting the extra parities of each of the extra ECC blocks; and generating an extra parity ECC block having the collected extra parities.

28. A method to record a data block including extra error correction coding (ECC) to an information storage medium in which an area to record extra ECC management information to manage the extra ECC is allocated, the method comprising:

generating a plurality of extra ECC blocks from an ECC block obtained by encoding user data;

generating an extra parity ECC block using the plurality of extra ECC blocks;

wherein the extra ECC is executed by interleaving rows of initial error correction coded user data;

generating extra ECC management information, wherein the extra ECC management information includes information on extra ECC and a mapping relation between information on locations in which ECC blocks for user data are recorded and information on locations in which extra parity data blocks corresponding to the user data are recorded;

recording the extra parity ECC blocks onto the information storage medium in an area allocated for user data; and recording the extra ECC management information onto the information storage medium in the area allocated for extra ECC management information.

* * * * *